Oct. 30, 1962 J. F. ZALESKI 3,061,791

MICROWAVE DETECTOR

Filed Nov. 23, 1956 2 Sheets-Sheet 1

INVENTOR.
JOHN F. ZALESKI
BY H. S. Mackey
ATTORNEY

Oct. 30, 1962 J. F. ZALESKI 3,061,791
MICROWAVE DETECTOR
Filed Nov. 23, 1956 2 Sheets-Sheet 2

INVENTOR.
JOHN F. ZALESKI
BY H. S. Mackey
ATTORNEY

United States Patent Office 3,061,791

Patented Oct. 30, 1962

3,061,791
MICROWAVE DETECTOR

John F. Zaleski, Valhalla, N.Y., assignor to General Precision, Inc., a corporation of Delaware Filed Nov. 23, 1956, Ser. No. 624,006
3 Claims. (Cl. 329—154)

This invention relates to velocity variation electronic tubes of the reflex or repeller type and having a single resonant cavity, and more especially to such tubes and associated circuits adapted or designed for use in the detection or demodulation of microwave electromagnetic energy.

At the present time crystal or semiconductor diodes are generally employed as detectors in microwave radio receivers. The modulated microwave signal is applied to a detector, which is followed by an amplifier. The most important quality of a microwave detector is freedom from internally generated noise. However, crystal and semiconductor diodes not only are quite noisy, but their internally generated noise is much greater at low frequencies, noise output being approximately inversely proportional to the demodulated frequency. In order to eliminate this audio frequency noise generation in the microwave detector the present practice is to employ a superheterodyne circuit, the microwave receiving antenna system being connected to conduct the received microwave signal containing audio amplitude modulation directly to the first detector to which is also applied heterodyning frequency energy. The resulting demodulated energy at an intermediate frequency, such as 30 mc.p.s., is applied to an intermediate frequency amplifier.

The amount of heterodyning frequency power which can be applied to such detectors is limited to a small amount, the signal-to-noise ratio reaching a maximum value at an optimum small heterodyning power. This is an inherent limitation of crystal and semiconductor diodes associated with temperature, and further limits their usefulness as microwave detectors because it limits the amount of heterodyne gain which can be secured.

The noisiness of semiconductor detectors at low frequencies precludes the use of single-detector receivers for audio and video modulated microwave signals which otherwise would be very useful in certain cases. Detector noisiness also sets the limit to the sensitivity of all existing microwave receivers, for detector noise is generally far greater than noise in the input signal and the detector is generally much noisier than the amplifier which follows it.

Because of the great need for a better microwave detector, klystrons have been tried, but have not heretofore been found quieter than semiconductor diodes and therefore have not so far displaced them for this use.

The present invention provides a microwave detector employing a hollow resonant chamber, the structure being in some cases closely similar to that of reflex klystron microwave oscillators. The invention also provides microwave detector circuits employing such structures. These resonant chamber detector circuits have been found to be less noisy than crystal and semiconductor diode detectors, and are even less noisy than the amplifier circuits following them. When the detector of this invention is employed as a superheterodyne first detector it thus removes the noise and sensitivity limitations of the present art. The instant detector also makes possible a practical single-detection receiver which demodulates from microwave frequency to audio frequency in a single step, because it does not have the frequency/noise limitation of semiconductor detectors. The present detector also frees microwave detectors from the burnout problem associated with semiconductor detectors, and in the case of radar and similar receivers permits absorption of high leakage energy direct from the transmitter without injury. This in turn permits great simplification and increased latitude of design.

In the operation of the instant invention in the form of a zero frequency heterodyne microwave detector to convert in a single step from microwave frequency to audio frequency, experiments have shown that the upper limitation on the amount of heterodyning power which may be used in weak signal detection has been largely lifted or removed. This results, for a given weak signal input, to increase in the output signal-to-noise ratio by increase of detector output signal. It has also been found by experiment that the addition of heterodyning power furthermore exerts a remarkable quieting effect upon the detector output, leading to still further increase in the signal-to-noise ratio by decrease of detector output noise.

The general purpose of this invention is to provide an improved microwave detector.

A more specific purpose is to provide a microwave detector circuit including a hollow resonant cavity which emits a signal having an improved signal-to-noise ratio in which the output signal noise is substantially no greater than the input signal noise.

A further understanding of this invention may be secured from the following detailed description and the associated drawings, in which.

Figure 5:
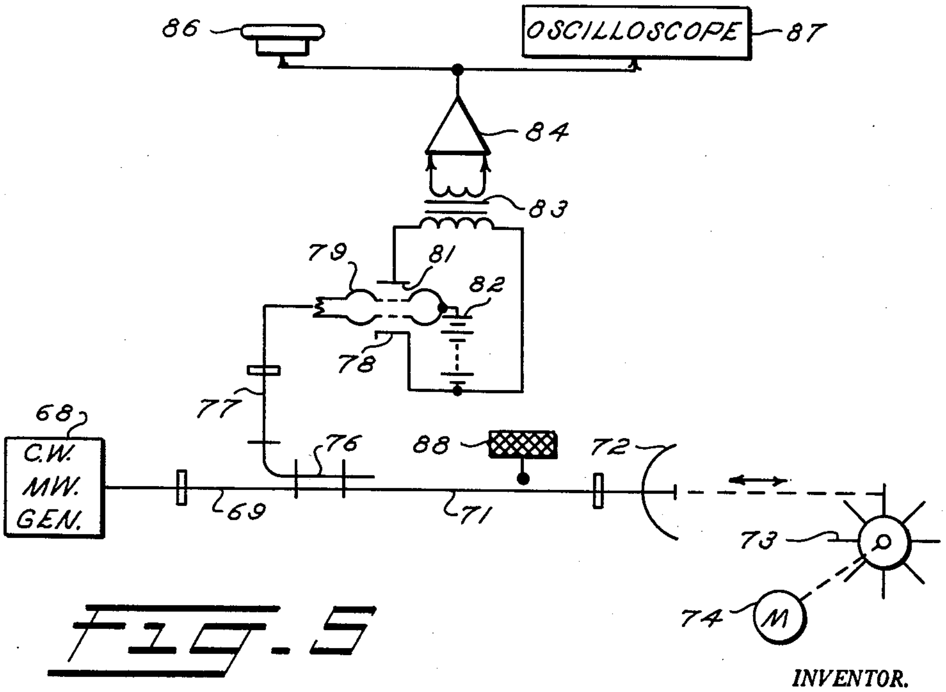

FIGURE 5 schematically depicts a continuous-wave microwave transmitter-receiver arranged for single-step zero frequency heterodyne detection and employing the detector of the invention.

Figure 1:
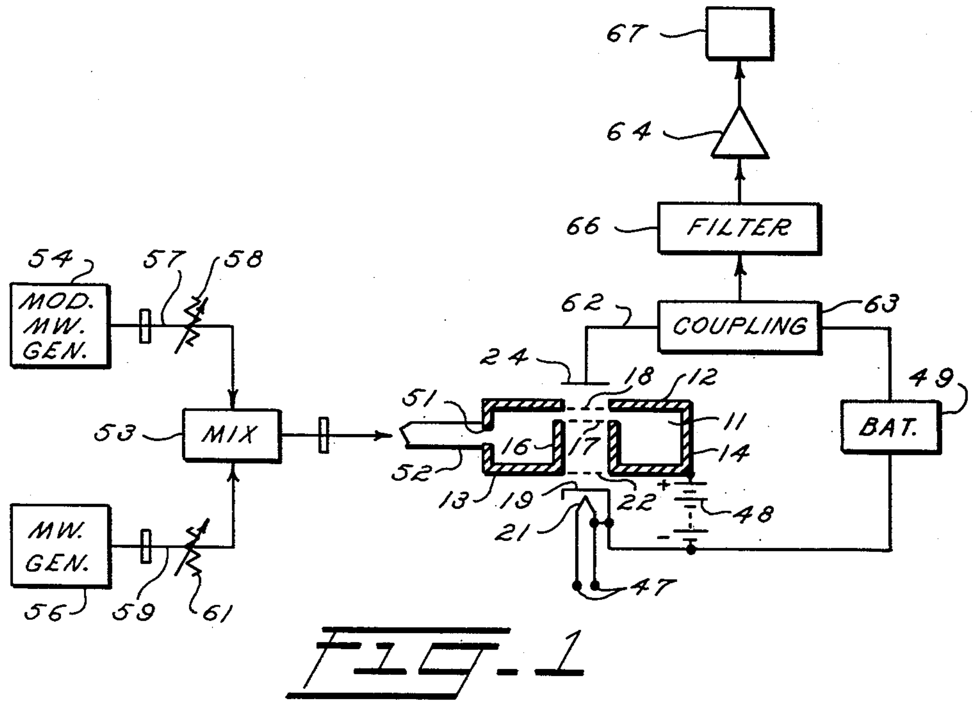
FIGURE 1 is a generalized schematic detector circuit embodying the invention.

Referring now to FIG. 1, a resonant cavity 11 is schematically depicted and is intended to represent any of the resonant cavity constructions usually employed in reflex klystrons. The cavity is bounded at top and bottom by two circular metallic discs 12 and 13, which are connected by a metallic cylindrical shell 14. The disc 13 is provided with a central reentrant cylinder 16. Two screens or grids 17 and 18 enclose central apertures in the reentrant cylinder 16 and disc 12. An electron gun is represented by a cathode 19, a cathode-heating filament 21, and a smoothing grid 22 which may be connected in any manner usual in the reflex klystron art but which is shown in this embodiment integrally attached and conductively connected to the resonant cavity disc 13. A reflector or repeller electrode 24 is positioned adjacent to grid 18, so that the electron stream emitted by this electron gun, after passing through smoother grid 22 and resonant chamber grids 17 and 18, is directed toward the reflector electrode 24.

Although the reflector electrode 24 is indicated as a plane disc, it may have any other form consistent with the function of intercepting all electrons passing through grid 18 toward the reflector. A highly desirable property of the repeller electrode 24 is that it have low secondary emission when struck by electrons. This electrode should therefore be made of or surfaced with carbon, gold, platinum or other substance which has the desirable properties of high work function and low secondary emission.

The resonant cavity direct current power supplies include filament supply terminals 47, FIG. 1, and a direct current resonant cavity bias voltage supply 48, with its negative terminal connected to the cathode 19 and its positive terminal connected to the disc 13 which is in turn conductively connected to the entire resonant cavity structure including the grids 22, 17 and 18. The value of the potential of the battery 48 may be, for example, 45 volts, although in some cases another voltage may be more effective. The reflector 24 is biased relative to the cathode 19 by the direct current source 49. This bias may well be zero, and in any case with usual construction and with potentials of battery 48 which are usually applied to small reflex klystron cavities, or with less potentials, a bias of zero volts applied by battery 49 is highly effective. However in some instances a bias from battery 49 of a fraction of a volt, positive or negative, may improve operation. In rare instances a slightly larger bias positive or negative may be more effective, but in no case will this bias exceed ten percent of the bias potential applied by battery 48 between the cathode 19 and the resonant cavity.

Microwave energy including the microwave signal to be detected is introduced into the resonant cavity 11 by conventional coupling means, such as a matched iris opening or a magnetic loop. In the embodiment depicted generally in FIG. 1 the coupling means is represented by a single iris opening 51 between the interior space of the resonant cavity 11 and a hollow rectangular waveguide 52. In general, two microwave energies are introduced into the detector cavity by microwave transmission lines, and they may be mixed, to add the energies without multiplication or demodulation, in an external mixer represented by the rectangle 53.

The two input microwave energies include in general amplitude-modulated microwave power from a source represented by rectangle 54. Although there is no limitation on the character, frequency spectrum width, spectrum center frequency, or percentage amount of the amplitude modulation, for the purpose of illustration the amplitude modulation is an audio frequency tone having a single frequency which fully modulates its carrier. A second microwave energy is derived from a source represented by rectangle 56. This microwave energy is unmodulated or at least is not modulated in the frequency range of interest including the modulation frequency of source 54. The frequency of the microwave energy from source 56 may be the same as or different from the microwave frequency of source 54. The functions of the microwave energy from source 56 include the provision of energy at a heterodyning frequency to provide demodulation by the heterodyne method, and also the provision of "quieting" microwave energy. This is a novel function which is primarily responsible for the extraordinary increase in signal-to-noise ratio attainable by use of this detector. Although the two sources are represented by separate rectangles 54 and 56, when the microwave energies have the same frequency the same microwave source may serve as both the modulated carrier source and the unmodulated energy source. Sometimes when the frequencies are the same and there is a single microwave source, the unmodulated path may not be a separately provided transmission line as schematically indicated by line 59, but may consist partly or entirely of a leakage path. An example of such a situation is found in continuous-wave radar-like transmitter-receivers.

The modulated generator 54 is connected through a rectangular waveguide 57 and an adjustable microwave attenuator 58 to the mixer 53, and the unmodulated generator 56 is connected through the rectangular waveguide 59 and an adjustable microwave attenuator 61 to the same mixer 53.

The output of the detector is taken from the conductor 62 connecting the reflector 24 to its biasing battery 49 or, if the latter be absent, direct to the cathode 19, by means of a coupling device 63. This coupling device is designed for the demodulated frequency and is conventional. Its output is connected to an amplifier 64 direct or, if, undesired demodulation products be present, they may be filtered out by a filter 66 interposed at the input of amplifier 64, the filter having a transmission characteristic covering the desired frequency band. The amplifier 64 output is applied to a utilizing device 67 which, for purpose of illustration, may be a telephone receiver or an oscilloscope.

In the operation of the detector circuit of FIG. 1 the battery 48 puts the resonant chamber structure 11 at a potential which is more positive than the cathode 19 by 10% to 20% of the potential which would be applied to cause the chamber to oscillate freely with appropriate negative reflector voltages. That is, if the anode voltage for oscillation were +300, the voltage for detection would be 30 to 60 volts. The reflector voltage is zero relative to the cathode. Under these conditions the chamber does not self-oscillate but if microwave energy be applied at the chamber resonant frequency the chamber will ring, or resonate, the oscillations dying out more or less slowly when the applied microwave energy is removed. The chamber should be carefully tuned. If the zero frequency detection method is employed the chamber may have a high Q and be tuned exactly to the applied frequency which is that of both the signal carrier and the heterodyning and quieting energy. If the receiver is of the double detection form and the intermediate frequency is 30 mc.p.s., the chamber may have a Q of 260, usual for reflex klystrons in the condition here used, and the tuned transmission band of the chamber will then be over 30 mc.p.s. wide, sufficient for the cavity to receive the frequencies of both sources 54 and 56, 30 mc.p.s. apart.

The power applied from generator 56 through waveguide 59 and mixer 53 to the resonant cavity detector may be almost as high as desired, the only limit being that imposed by sparkover within the cavity, and both signal and noise improving with indefinitely high increase of heterodyning and quieting power from generator 56. As as example, heterodyning and quieting power may certainly be increased above the optimum semiconductor heterodyne power of 10 microwatts by a factor of at least 1000, to 10 milliwatts, and probably by a factor which may attain $10^6$, to 10 watts, the upper limit not as yet having been found. As has been stated, as the heterodyning and quieting power is increased the output signal for a given input signal is increased in amplitude while the output noise for a given input noise is decreased in amplitude. Both changes increase the detector output signal-to-noise ratio relative to the detector input signal-to-noise ratio.

In the operation of the resonant cavity 11, a small signal being received from generator 54 and none from generator 56, with 100 volts applied from battery 48 and zero volts applied from battery 49, the cathode 19 emits an electron stream which is smoothed by smoother grid 22 and passes through the cavity grid 17. The cavity does not generate oscillations. In the space betwen grids 17 and 18 the electron stream is velocity modulated by the electro-magnetic field of the resonator in accordance with the energization by the input microwave signal. In the course of this velocity modulation a portion of the "noisiness" of the electron stream is removed, which is to say that noise due to possession by individual electrons of different velocities, randomly distributed, is largely removed in the velocity modulation process.

The velocity-modulated electron stream passes through grid 18 and drifts with decreasing velocity toward the reflector 24. Some of the electron stream strikes the reflector and may cause some secondary emission. Some electrons may fail to reach the reflector. The electron current is different during different parts of the modulating frequency cycle, so that a small current flows in conductor 62 at the modulating frequency. The circuit of conductor 62 is not capable of supporting the microwave frequency, so that only energy of the modulating frequency is coupled by device 63 to the amplifier 64 and indicated on device 67. If the device 67 is either a telephone receiver or a cathode ray oscilloscope the amplitudes of the demodulated signal and of the accompanying signal may be separately distinguished and qualitatively or quantitatively noted.

If the voltage of battery 48 be decreased, an improvement in the signal-to-noise ratio occurs. When the generator 56 is started, its frequency being that of the generator 54 carrier, the mode of demodulation is changed from simple rectification to heterodyne demodulation with an increase of output signal strength which increases at first rapidly and then more slowly, as the power received from generator 56 is increased. Most important, the indicator 67 meanwhile indicates a large diminution of output noise, this decrease accompanying the increase of generator 56 output. This decrease of output signal noise continues until the amount of noise in the output signal is merely of the order of that which might be expected to be generated in a solid conductor having the same resistance as that of the resonant cavity. Thus the signal-to-noise ratio of the output signal improves as the heterodyning and quieting microwave power increases both because the output signal increases and because the output noise decreases.

Figure 2:
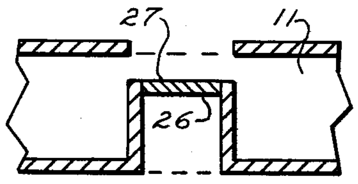
FIGURES 2, 3 and 4 illustrate various ways of generating the electron stream within the velocity-modulated detector component.
Figure 3:
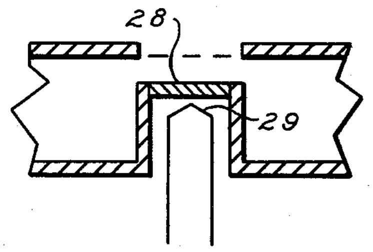

It is desirable to operate the cavity 11 at as low a temperature as possible in order to increase its efficiency and thus to increase the signal-to-noise ratio of its output signal as a microwave detector. The stream of electrons which must be passed through the resonant cavity 11 in order to cause it to operate as a microwave detector, when generated by an electron gun and aimed at grid 17 as described, have a deleterious heating effect. This heating effect may in part be eliminated by substituting another form of electron generator for the electron gun of FIG. 1, and positioning the generator within the resonant cavity itself. Two forms of generator are indicated in FIGS. 2 and 3. In FIG. 2 the resonant cavity electron stream access grid 17, FIG. 1, is replaced by a solid disc 26, FIG. 2, the upper portion or at least the upper surface 27 of which is composed of a radioactive substance which spontaneously and continuously emits beta rays or electrons. Alternatively, a low-temperature thermal electron-emitting surface 28, FIG. 3, within the resonator 11 is selectively heated by a heater outside of the resonator 11 schematically represented by a filament 29.

Figure 4:
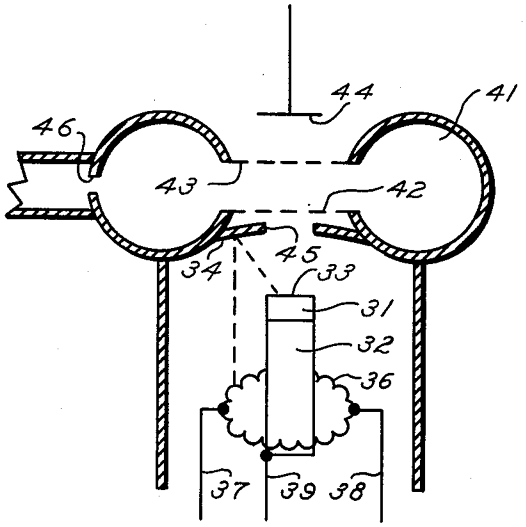

Still another way of generating the electron stream is indicated in FIG. 4, in which an element 31 is composed of a substance such as selenium which emits electrons when illuminated by visible light or ultraviolet radiation. The element 31 is supported on a conductive post 32 and is arranged so that its sensitive surface 33 is generally at the focus of a metallic concave, reflecting mirror surface 34. A light-emitting element schematically represented by an incandescent filament 36 surrounds the central conductive post 32 and is energized through conductors 37 and 38. A cathode conductor 39 is conductively connected through post 32 to the photoelectric element 31. The remainder of the device is substantially similar to the resonant chamber device of FIG. 1. It consists of an annular resonant chamber 41 closed by grids 42 and 43, with a repeller electrode 44 and a microwave signal ingress coupling device 46.

In the operation of the photoelectric electron gun of FIG. 4, light from light source 36 is collected by mirror 34 and reflected to the cathode surface 33. The source 36 is far enough from the surface 33 and from the anode or resonant chamber structure that little or no heat can reach them from source 36. The only heating which can occur in the resonant chamber therefore is that due to electron impact or to microwave currents induced in the inner surfaces by microwave energy introduced at coupling device 46. Electrons emitted by surface 33 pass through a central aperture 45 in mirror 34 and then through grids 42 and 43 toward the repeller 44. The detector operation of the device is identical in all remaining respect to that described in connection with FIG. 1.

FIGURE 5 depicts a radar-like circuit which is made operable by the incorporation therein of the detector of the present invention. This is noteworthy as a practical circuit both because it demodulates microwave to an audio signal in a single step and because it employs a continuous wave transmitter-receiver in full-duplex operation. A continuous-wave microwave generator 68 transmits unmodulated microwave energy through rectangular hollow guide conductors 69 and 71 to a radiator 72, which radiates the microwave energy into space. At a distance from radiator 72 a modulating instrumentality, here shown by way of example, as a rotating microwave reflector 73 rotated by a motor 74 intermittently echoes or reflects part of the radio energy at an audio frequency. Part of the reflected energy, thus amplitude modulated at an audio frequency, is picked up by the radiator 72 which thus serves both as a radiator and as a receiving antenna. A ferrite unidirectional coupler 76, such as that described in Patent No. 2,644,930 of C. H. Luhrs, transmits energy applied to it from transmission line 69 ideally only to transmission line 71, but energy applied from transmission line 71 is transmitted by coupler 76 ideally only to hollow rectangular guide transmission line 77. Thus ideally all transmitted energy is kept out of line 77 and ideally all received energy is coupled to line 77 and none to the generator 68. The received energy is applied to a velocity-modulated detector as described in connection with FIG. 1 and indicated in FIG. 5 by cathode 78, resonant chamber 79 and reflector 81. The detector power supply circuit is generally indicated by battery 82 and the reflector circuit is audio coupled by an audio transformer 83 to an audio amplifier 84. The amplified output may be heard in telephone receiver 86 and its character may be seen and analyzed in oscilloscope 87.

Some unmodulated microwave energy reaches the detector by reflection from antenna 72 due to imperfect matching, and from any other circuit discontinuities. Additional energy leaks through coupler 76, such devices being limited in isolation. Provision is made for additional, adjustable reflection of unmodulated microwave energy into the detector by the employment of a probe 88 which can be adjusted in its depth of insertion in transmission line 71. It thus reflects an adjustable amount of energy from generator 68 into transmission line 77, permitting the unreflected remainder to pass to radiator 72.

The probe 88 is reactive in nature, and can be adjusted in position along the transmission line. The phase of microwave energy reflected from the probe to the detector can therefore be completely controlled.

The function of the modulated generator 54, FIG. 1 is discharged principally by the continuous wave generator 68 and intermittent reflector 73 of FIG. 5. The unmodulated microwave energy is secured by leakage and probe reflection from the same generator. Mixing without modulation is secured by the transmission of both modulated and unmodulated energy through coupler 76, which therefore generally corresponds to the mixer 53, FIG. 1. The transformer 83, FIG. 5, couples audio frequency energy from the repeller 81 to the indicating devices and thus performs the function of the coupling device 63, FIG. 1.

When a crystal or semiconductor diode detector is substituted for the velocity modulated detector in FIG. 5, the circuit is inoperative because unmodulated continuous wave power leakage both reduces the detector signal-to-noise ratio and, at all but the smallest powers, instantly burns out the detector. In the case of the velocity-modulated detector however, in zero-frequency heterodyne detection the unmodulated microwave energy is not only not harmful, but greatly increases the signal-to-noise ratio of the detector output.

The phases of fortuitously reflected unmodulated microwave energies are random at the velocity-modulated detector, but it has been found by experiment that the introduction of this random phase energy is advantageous in the detection of most signals. It has also been found that some advantage is gained in weak signal detection by controlling the phase of the energy reflected from the probe 88.

What is claimed is:

1. A microwave detector comprising, a hollow resonant chamber, an electron emitter, means for passing an electron stream from said emitter through said hollow resonant chamber, a reflector electrode positioned in the the path of said electron stream after its passage through said chamber, a direct potential source connected between said hollow resonant chamber and said emitter, the positive terminal of said source being connected to said chamber and the potential magnitude thereof being less than 15% of the magnitude required for self-oscillation of the chamber, a coupling device connected between said reflector electrode and said emitter, means introducing an amplitude-modulated microwave signal into said chamber, means introducing a second unmodulated microwave signal into said chamber, said chamber being tuned to said signals, and means connected to said coupling device indicating the modulations of said modulated microwave signal.

2. A microwave detector in accordance with claim 1 in which said electron emitter is a radioactive beta ray emitter.

3. A microwave detector in accordance with claim 1 in which said electron emitter is a photo-cathode.

References Cited in the file of this patent

UNITED STATES PATENTS

| | | |
|---|---|---|
| 2,293,151 | Linder | Aug. 18, 1942 |
| 2,314,794 | Linder | Mar. 23, 1943 |
| 2,517,731 | Spoull | Aug. 8, 1950 |
| 2,712,062 | Frantz | June 28, 1955 |